US006632891B1

(12) United States Patent
Tada et al.

(10) Patent No.: US 6,632,891 B1
(45) Date of Patent: Oct. 14, 2003

(54) FLAME-RETARDANT RESIN, COMPOSITION THEREOF, AND PROCESS FOR PRODUCING THE SAME

(75) Inventors: Yuji Tada, Tokushima (JP); Yoichi Nishioka, Tokushima (JP); Tadao Yabuhara, Tokushima (JP); Takashi Kameshima, Tokushima (JP); Shinji Nakano, Tokushima (JP)

(73) Assignee: Otsuka Kagaku Kabushiki Kaisha, Osaka-fu (JP)

( * ) Notice: Subject to any disclaimer, the term of this patent is extended or adjusted under 35 U.S.C. 154(b) by 0 days.

(21) Appl. No.: 09/623,472
(22) PCT Filed: Mar. 11, 1999
(86) PCT No.: PCT/JP99/01169
§ 371 (c)(1),
(2), (4) Date: Sep. 13, 2000
(87) PCT Pub. No.: WO99/46314
PCT Pub. Date: Sep. 16, 1999

(30) Foreign Application Priority Data

Mar. 13, 1998 (JP) ............................................. 10-082681

(51) Int. Cl.$^7$ ........................... C08G 63/91; C08L 67/00
(52) U.S. Cl. ..................... 525/415; 525/437; 525/450; 525/462; 525/467; 528/168; 528/287; 528/354; 528/363
(58) Field of Search .................................. 525/437, 462, 525/467, 415, 450; 528/168, 287, 363, 354

(56) References Cited

U.S. PATENT DOCUMENTS

| 3,597,394 | A |   | 8/1971 | Rawlings |          |
|-----------|---|---|--------|----------|----------|
| 4,094,856 | A |   | 6/1978 | Guschl   | 260/45.9 |
| 4,191,715 | A |   | 3/1980 | Wu et al.|          |
| 4,680,370 | A |   | 7/1987 | Williams |          |
| 5,677,416 | A | * | 10/1997| Ko       | 528/185  |

FOREIGN PATENT DOCUMENTS

| EP | 728811   |   | 8/1996 |
|----|----------|---|--------|
| JP | 09053009 | * | 2/1997 |

OTHER PUBLICATIONS

English abstract of JP, 09–053,009, A–Maruyama et al.
English abstract of JP, 07–292,233, A–Watanabe et al.
Journal of Fire Sciences, vol. 11, No. 4, 1993, 320–328, Allen C.W.

* cited by examiner

Primary Examiner—Patricia A. Short
(74) Attorney, Agent, or Firm—Rothwell Figg Ernst & Manbeck

(57) ABSTRACT

A flame-retardant resin composition comprising a phosphazene flame retardant and a polyester resin, wherein the flame retardant is bonded to the molecules of the polyester resin via the ester group thereof, can retain a high flame retardance for a prolonged term with little or no vaporization with time and is excellent in flame retardance, impact resistance, properties and processability.

5 Claims, 2 Drawing Sheets

FLAME-RETARDANT RESIN, COMPOSITION THEREOF, AND PROCESS FOR PRODUCING THE SAME

This application is the National Stage Application of PCT/JP99/01169 filed Mar. 11,1999.

TECHNICAL FIELD

The present invention relates to a flame-retardant resin composition and a process for preparing the same, and more particularly to a halogen-free flame-retardant resin prepared by reacting a reactive phosphazene compound as a flame retardant with a polyester resin to impart remarkably increased flame retardance to the resin without vaporization or loss, a composition thereof and a process for preparing the same.

BACKGROUND ART

Because of their superiority in moldability, mechanical properties, electrical characteristics and appearance, plastics are useful as materials for office automation equipment such as computers, word processors, printers and copying machines, electrical appliances such as television sets, videos and game machines, and communications equipment such as telephones and facsimile machines. However, plastics have a drawback of being more flammable than metal materials and inorganic materials. From the viewpoint of safety, there is an increased world-wide demand for making plastics flame-retardant, and regulations were tightened. A variety of methods have been proposed for rendering flammable plastics flame-retardant. Generally the proposed methods comprise mixing plastics with a chlorine compound, a bromine compound or like halogen compounds capable of producing a high flame retardant effect. It is also known to achieve a synergistic flame retardant effect by further adding antimony oxide in the method. Useful bromine compounds include, for example, decabromodiphenyl ether, tetrabromobisphenol-A, brominated phthalimide and like nuclear bromine-substituted aromatic compounds. The addition of these excellent flame retardants imparts a high flame retardance to plastics but poses the following problems: the impact resistance is decreased and heat deformation temperature is lowered; the flame retardant bleeds out on the surface of plastics moldings, resulting in impaired appearance of the moldings; and the mold and screw are eroded in the presence of a decomposition gas of halogen compound in the molding process. Also undesirable from safety and hygiene viewpoints is poison generated from a low-molecular-weight bromine compound or chlorine compound when plastics are processed or burned. In this background, it has been desired to provide a flame-retardant resin composition substantially free of a bromine or chlorine compound or like halogen compounds.

Known methods of rendering plastics flame-retardant without use of a halogen compound include methods wherein plastics are mixed with an inorganic metal hydroxide such as aluminum hydroxide or magnesium hydroxide (JP-A-51-132254, JP-A-56-136832 and JP-A-60-13832). However, the methods require a large amount of the inorganic metal hydroxide to give satisfactory degree of flame retardance, and have a shortcoming that the inherent properties of plastics are lost.

On the other hand, prior art literature disclose techniques for imparting flame retardance without using such inorganic metal hydroxide wherein plastics are mixed with a phosphorus compound such as phosphoric acid ester to impart flame retardance. For example, the proposed flame-retardant resin compositions include a resin composition comprising a blend of mixed resins, i.e. an aromatic polycarbonate and rubber reinforced styrene resin, with triphenyl phosphate and polytetrafluoroethylene (PTFE) (JP-B-9-19003) and a resin composition comprising a blend of mixed resins, i.e. an aromatic polycarbonate and rubber reinforced styrene resin, with an oligomer of phosphoric acid ester and PTFE (NL 8802346). These methods, however, entail various problems in terms of properties of plastics and processability thereof. Stated more specifically, the phosphoric acid ester has a low melting point and poor compatibility with resins so that the resin composition is given low heat resistance, and that the phosphoric acid ester oozes out from the resin in the molding process, thereby soiling the mold and becoming vaporized. JP-A-5-1079 and U.S. Pat. No. 5,122,556 disclose techniques for preparing a flame-retardant resin by mixing a thermoplastic resin with a crystalline powder of aromatic diphosphate flame retardant. The disclosed methods, however, failed to produce a resin composition which is satisfactory both in properties and in processability. Since the phosphoric acid esters used in these techniques have an activity to plasticize the resin, the techniques essentially use PTFE as a drip inhibitor (for inhibiting dripping of live charcoal in burning) and therefore failed to produce a substantially halogen-free flame-retardant resin composition.

Techniques for rendering plastics flame-retardant by mixing plastics with a phosphazene compound as a flame retardant are disclosed in literature. For example, it is proposed to provide a flame-retardant resin composition comprising a polycarbonate resin and a phosphazene compound admixed therewith (JP-A-51-37149), a flame-retardant resin composition comprising a phosphazene compound and a polycarbonate compound or a mixture of the same and other thermoplastic resin (JP-A-7-292233), and a flame-retardant resin composition comprising a phosphazene compound and a mixture of an aromatic polycarbonate resin and a rubber reinforced styrene resin (JP-A-9-53009). When a phosphazene compound is added to the resin, the flame retardance is enhanced as clear from the increase of limiting oxygen index (LOI). Yet, problems remain unresolved since the phosphazene compound used has a low melting point, and the resin composition is lowered in heat deformation temperature, heat resistance and mechanical properties. Further, since PTFE is essentially used as the drip inhibitor, a substantially halogen-free flame-retardant resin composition has not been obtained.

An object of the present invention is to provide a flame-retardant resin which is molded without bleed of flame retardant and which neither reduces the heat deformation temperature of flame-retardant resin composition nor impairs the heat resistance and mechanical properties thereof, its composition and a process for preparing the same.

Another object of the invention is to provide a flame-retardant resin prepared without essential use of PTFE as the drip inhibitor and which is substantially free of halogen, its composition and a process for preparing the same.

DISCLOSURE OF THE INVENTION

The present invention provides a flame-retardant resin composition comprising a phosphazene flame retardant and a polyester resin, wherein the flame retardant is bonded to the molecules of the polyester resin via the ester group thereof.

Preferred embodiments of the invention are as follows.

(1) A flame-retardant resin comprising a phosphazene flame retardant and a polyester resin, wherein the flame retardant is bonded to the molecules of the polyester resin via the ester group thereof.

(2) A flame-retardant resin comprising a phosphazene flame retardant and a polyester resin, wherein ester exchange reaction is carried out using the flame retardant in an amount of 0.1 to 100 parts by weight per 100 parts by weight of the polyester resin.

(3) A process for preparing a flame-retardant resin comprising a phosphazene flame retardant and a polyester resin, the process comprising conducting ester exchange reaction between the flame retardant and the polyester resin in a molten state.

(4) A process for preparing a flame-retardant resin comprising a phosphazene flame retardant and a polyester resin, wherein the phosphazene flame retardant is at least one species selected from cyclic phosphazene compounds and straight-chain phosphazene compounds as defined in claim 2.

The present inventors found the following. A reactive phosphazene compound as the flame retardant is subjected to ester exchange reaction with a polyester resin to bond to the molecules of polyester resin via the ester group thereof without vaporization or loss of retardant. Using the obtained resin, a flame-retardant resin composition excellent in heat resistance and mechanical properties is produced without bleeding the flame retardant in the molding process and without reducing the heat deformation temperature of the resin composition. The present invention was completed based on the above-mentioned novel finding.

According to the present invention, a phosphazene flame retardant is reacted with a polyester resin to give a flame-retardant polyester resin containing the phosphazene flame retardant bonded to the molecules of the polyester resin via the ester group thereof. Then, a resin composition containing such resin is provided.

The present invention will be described in more detail. First of all, the reactive phosphazene compound to be used in the invention will be described.

The phosphazene compound to be used in the invention is a compound represented by the formula (I).

(I)

wherein n is the number of repetition, X and Y are independently O, S, NH or $NR^3$ group wherein $R^3$ is alkyl group having 1 to 4 carbon atoms, at least one of $R^1$ and $R^2$ groups which are n in number is a group selected from the groups shown below in chemical formula 2, and the remaining $R^1$ and $R^2$ groups are independently the groups represented by chemical formula 3, each of $R^4$, $R^6$ and $R^7$ groups is hydrogen atom or alkyl group having 1 to 4 carbon atoms, $R^5$ is alkyl group having 1 to 4 carbon atoms, m is an integer of 1 to 10, and n is an integer of 3 to 25 when the phosphazene compound is a cyclic compound, or an integer of 3 to 1000 when the phosphazene compound is a straight-chain compound.

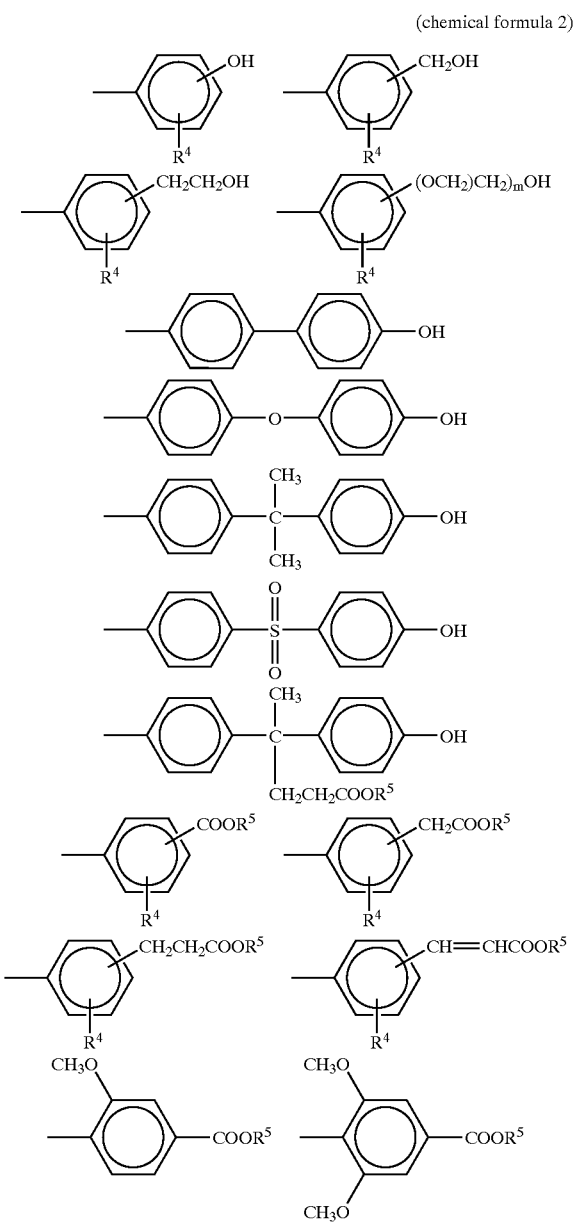

(chemical formula 2)

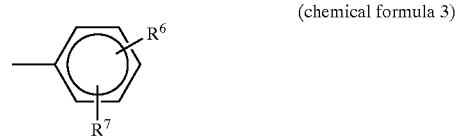

(chemical formula 3)

Examples of phosphazene compounds useful in the invention are cyclotriphosphazene, cyclotetraphosphazene, clyclopentaphosphazene wherein mixing substitution is effected for hydroxyphenoxy group and phenoxy group and like cyclic phosphazene compounds or straight-chain phosphazene compounds. Specific examples of the cyclic phosphazene compound wherein mixing substitution is effected for hydroxyphenoxy group and phenoxy group are mono(hydroxyphenoxy)pentaphenoxy cyclotriphosphaneze, di(hydroxyphenoxy)tetraphenoxy cyclotriphosphaneze, tri(hydroxyphenoxy)triphenoxy cyclotriphosphaneze, tetra(hydroxyphenoxy)diphenoxy cyclotriphosphaneze, penta (hydroxyphenoxy)monophenoxy cyclotriphosphaneze and like cyclotetraphosphaneze compounds, mono(hydroxyphenoxy)heptaphenoxy cyclotetraphosphaneze, di(hydroxyphenoxy)hexaphenoxy cyclotetraphosphaneze, tri(hydroxyphenoxy)pentaphenoxy cyclotetraphosphaneze, tetra(hydroxyphenoxy)tetraphenoxy cyclotetraphosphaneze, penta(hydroxyphenoxy)triphenoxy cyclotetraphosphaneze, hexa(hydroxyphenoxy)diphenoxy cyclotetraphosphaneze, hepta(hydroxyphenoxy)monophenoxy cyclotetraphosphaneze and like cyclotetraphosphaneze compounds, cyclopentaphosphaneze compounds wherein mixing substitution is effected for hydroxyphenoxy group and phenoxy group and like cyclic phosphazene compounds. Further examples include straight-chain phosphazene compounds wherein mixing substitution is effected for hydroxyphenoxy group and phenoxy group. These compounds can be used in combination or as a mixture of cyclic and straight-chain compounds or as an oligomer.

Selectable in place of the hydroxyphenoxy group of the phosphazene compound are hydroxymethylphenoxy, hydroxyethylphenoxy, hydroxyethoxyphenoxy, methoxycarbonyl-phenoxy, ethoxycarbonylphenoxy, methoxycarbonylmethylphenoxy, methoxycarbonylethylphenoxy, methoxycarbonylvinylphenoxy, methoxycarbonyl(methoxy)phenoxy and methoxycarbonyl-(dimethoxy)phenoxy. These groups may be those which may be directly substituted with alkyl group having 1 to 4 carbon atoms on an aromatic ring. It is possible to select hydroxyphenylphenoxy, hydroxyphenoxyphenoxy, hydroxyphenylcumenyloxy, hydroxyphenylsulfonylphenoxy and hydroxyphenyl {methoxycarbonyl(methyl)propylphenoxy}. Also selectable are compounds which have S, NH or $NR^3$ in place of the oxygen atom of said phenoxy group. The groups may be a mixture of at least two kinds of substituents.

The phosphazene compound of the invention can be prepared by various processes. Usable as the raw material is, for example, a cyclic or straight-chain phosphazene compound wherein n is an integer of 3 to 25 such as hexachlorocyclotriphosphazene or octachlorocyclotetra-phosphazene which can be prepared by reacting ammonium chloride with phosphorus pentachloride at 120 to 130° C. as shown below in the formula (II). The solvents usable in the reaction include, for example, tetrachloroethane and chlorobenzene.

$nPCl_5 + nNH_4Cl \longrightarrow$

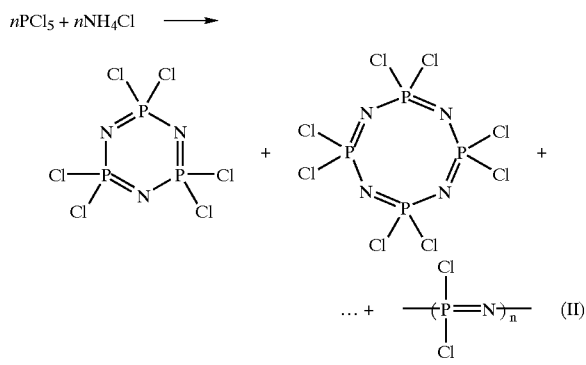

Dichlorophosphazene wherein n is an integer of 3 to 1000 which can be used as the straight-chain phosphazene compound in the invention can be prepared by taking out hexachlorocyclotriphosphazene from said mixture of cyclic and straight-chain compounds, heating the phosphazene at 220 to 250° C and subjecting it to ring opening polymerization as shown below in the formula (III).

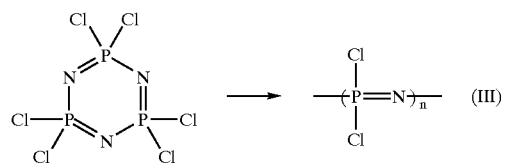

The phosphazene compound of the invention can be prepared, for example, by reacting the above-obtained phosphazene compound with an alkali metal salt of aromatic phenol admixed in a desired ratio. For example, metal sodium is added to hydroquinone monomethyl ether and phenol admixed in a desired ratio to give the corresponding sodium salt of phenol as shown below in chemical formula 6. Then, a cyclic and/or straight-chain phosphazene compound of the formula (II) wherein, for example, n is an integer of 3 to 25 is added to the obtained sodium salt of phenol. The mixture is heated at 50 to 150° C. for 1 to 24 hours, and is subjected to substitution reaction, thereby producing a phosphazene compound having methoxyphenoxy group. The obtained phosphazene compound having methoxyphenoxy group is heated together with pyridine hydrochloride at 200 to 220° C. for 1 to 3 hours, whereby the methoxy group is converted to hydroxy group, giving the contemplated phosphazene compound having hydroxyphenoxy group.

(chemical formula 6)

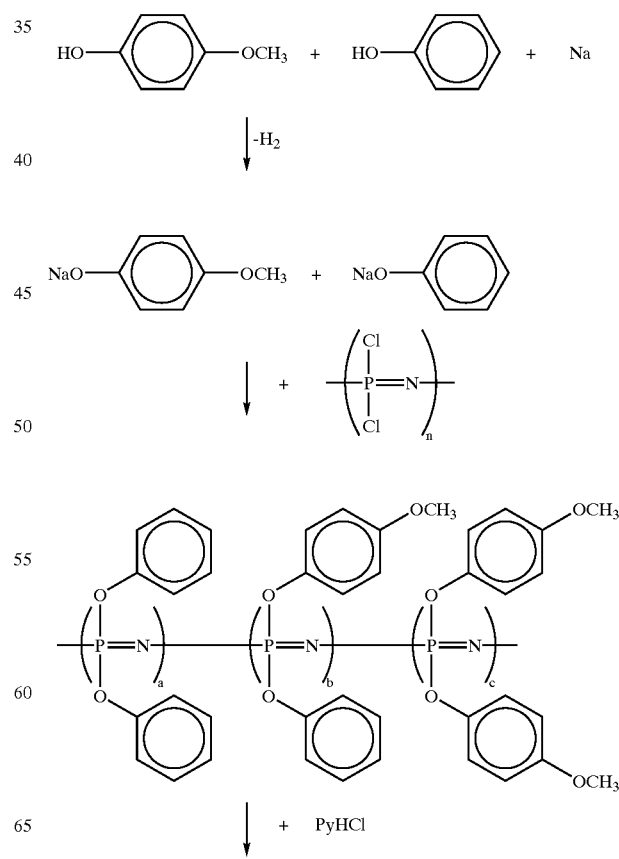

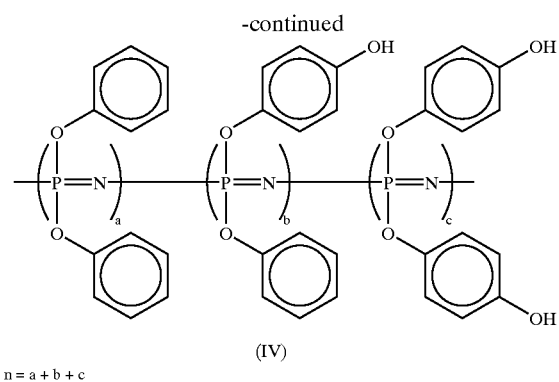

(IV)

n = a + b + c

The contemplated phosphazene compound having hydroxyphenoxy group can be prepared by substitution reaction and deprotection reaction as described above. The reaction is feasible with or without a solvent. When a solvent is used, it is preferred to use, for example, benzene, toluene, xylene or tetrahydrofuran. For the efficiency of substitution reaction, tetrahydrofuran is more preferably used as the solvent. The substitution reaction is completed if it is conducted at its reflux temperature for about 5 hours. The deprotection reaction is feasible with use of a reagent such as trimethylsilane iodide, aluminum trichloride, aluminum tribromide, boron tribromide, hydrogen bromide or hydrogen iodide as well as with use of pyridine hydrochloride. Other known processes can be employed.

Other processes than those described above include a process wherein a cyclic and/or straight-chain dichlorophosphazene compound is reacted with hydroquinone and an alkali metal salt of phenol and a process wherein dichlorophosphazene oligomer is reacted with an alkali metal salt of hydroquinone monomethyl ether, and sequentially the reaction mixture is reacted with an alkali metal salt of aromatic phenol, followed by deprotection of methoxy group.

The contemplated phosphazene flame retardant having ester group can be prepared by the same substitution reaction.

The phosphazene flame retardant to be used is a compound having hydroxyl or ester group at the end of molecules. From the viewpoints of production process and ease of acquisition, it is suitable to use phosphazene oligomers (a mixture of cyclic and straight-chain compounds) wherein mixing substitution is effected for hydroxyphenoxy group and phenoxy group, hydroxyethylphenoxy group and phenoxy group, methoxycarbonylphenoxy group and phenoxy group, or ethoxycarbonylphenoxy group and phenoxy group.

The foregoing phosphazene flame retardant is added alone or in suitable combination to the polyester resin. The amount of the flame retardant to be used is 0.1 to 100 parts by weight, preferably 1 to 50 parts by weight, per 100 parts by weight of the polyester resin. When the flame retardant is used in an amount within said range, flame retardance can be economically imparted to a satisfactory extent and the obtained resin composition is excellent in impact resistance and heat resistance.

Suitable polyester resins to be used in the invention are those having a relatively high melt temperature which are amenable to ester exchange reaction.

Examples of such polyester resins are polycarbonate, polyethylene terephthalate, polyethylene naphthalate, polypropylene terephthalate, polybutylene terephthalate, polyhexamethylene terephthalate, polycyclohexanedimethylene terephthalate, poly(ethylene terephthalate/cyclohexane-dimethylene terephthalate) copolymers, poly(ethylene terephthalate/ethylene isophthalate) copolymers, polyester ether, polyarylate, polyoxybenzoyl, polycaprolactone and like thermoplastic polyester resins.

The polyester resin useful in the invention may be used in mixture with other thermoplastic resins than polyester resins. Examples of other thermoplastic resins than polyester resins are polyethylene, polypropylene, polyisoprene, polybutadiene, polystyrene, impact-resistant polystyrene, acrylonitrile-styrene resins (AS resins), acrylonitrile-butadiene-styrene resins (ABS resins), methyl methacrylate-butadiene-styrene resins (MBS resins), methyl methacrylate-acrylonitrile-butadiene-styrene resins (MABS resins), acrylonitrile-acryl rubber-styrene resins (AAS resins), polyalkyl (meth)acrylate, modified polyphenylene ether, polyamide, polyphenylene sulfide, polyether sulfone, polysulfone, polyether ketone, polyether ether ketone, polyamideimide, polyether imide, polyimide and liquid crystal polymers. These resins can be used either alone or in combination.

The polycarbonate resins to be used in the invention may be optionally branched thermoplastic aromatic polycarbonate polymers or copolymers which can be prepared by reacting phosgene or carbonic acid diester with an aromatic dihydroxy compound or a mixture of the same and a small amount of at least trifunctional polyhydroxy compound. The polycarbonate resin has a viscosity-average molecular weight of 10,000 to 100,000, preferably 15,000 to 50,000 as calculated from a solution viscosity of methylene chloride at 25° C.

Examples of useful aromatic dihydroxy compounds are bis(hydroxyaryl)alkanes such as 2,2-bis(4-hydroxyphenyl)propane (bisphenol A), 2,2-bis(3,5-dibromo-4-hydroxyphenyl)propane (tetrabromobisphenol A), bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-t-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane and bis(4-hydroxyphenyl)diphenylmethane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone, resorcin and 4,4'-dihydroxydiphenyl.

These aromatic dihydroxy compounds can be used either alone or in combination. Of the above examples, 2,2-bis(4-hydroxyphenyl)propane is suitable to use.

The branched aromatic polycarbonate resin can be prepared by concomitant use of at least trifunctional polyhydroxy compound. Examples of such polyhydroxy compounds 1,1-bis(3-t-butyl-are phloroglycine, 2,6-dimethyl-2,4,6-tri(4-hydroxyphenyl)-3-heptene, 4,6-dimethyl-2,4,6-tri(4-hydroxyphenyl)-2-heptene, 1,3,5-tri(2-hydroxyphenyl)benzene, 1,1,1-tri(4-hydroxyphenyl)ethane, 2,6-bis(2- hydroxy-5-methylbenzyl)-4-methylphenol and α, α', α"-tri(4-hydroxyphenyl)-1,3,5-triisopropyl-benzene. Further examples include 3,3-bis(4-hydroxyaryl)oxyindole (isatinbisphenol), 5-chloroisatin-bisphenol, 5,7-dichloroisatinbisphenol and 5-bromoisatin-bisphenol.

In the case of the polycarbonate prepared using phosgene, a chain terminator or a chain transfer agent may be used. Examples of the chain terminator or the chain transfer agent are phenol, p-t-butylphenol, tribromophenol, long-chain alkylphenol, hydroxybenzoic acid alkyl ester, alkyl ether phenol and like aromatic phenols, methanol, butanol and like aliphatic alcohols, mercaptane and phthalic acid imide. Further examples include aliphatic or aromatic carboxylic acid chloride and aliphatic or aromatic carboxylic acid. These polycarbonate resins can be used either alone or in combination.

The phosphazene flame retardant of the invention, when mixed alone with a molten polyester resin before molding, causes ester exchange reaction at the ester linkage portion of molecules of polyester resin and can be fixed to the resin by ester linkage. When required, a catalyst for ester exchange reaction can be added to further accelerate the ester exchange reaction.

There is no limitation on the kind of catalysts for ester exchange reaction insofar as they are used in this field. Examples of useful catalysts are lithium hydroxide, sodium hydroxide, potassium hydroxide, calcium hydroxide and like hydroxides of alkali metals or alkaline earth metals; tin chloride, zinc chloride, ferric chloride, lead chloride and like halogenated transition metals; aluminum lithium hydride, sodium boron hydride, tetramethylammonium boron hydride and like alkali metal salts, alkaline earth metal salts or quaternary ammonium salts of boron or aluminum hydrides; lithium hydride, sodium hydride, calcium hydride and like hydrides of alkali metals or alkaline earth metals; lithium methoxide, sodium methoxide, calcium methoxide and like alkoxides of alkali metals or alkaline earth metals; lithium phenoxide, sodium phenoxide, magnesium phenoxide, LiO—Ar—OLi, NaO—Ar—ONa (Ar=aryl group) and like aryloxides of alkali metals or alkaline earth metals; lithium acetate, sodium acetate, calcium acetate, sodium benzoate and like organic acid salts of alkali metals or alkaline earth metals; zinc oxide, zinc acetate, zinc phenoxide and like zinc compounds; boron oxide, boric acid, sodium borate, trimethyl borate, tributyl borate, triphenyl borate, ammonium borates or phosphonium borates represented by the formula $(R^7 R^8 R^9 R^{10})$ NB $(R^7 R^8 R^9 R^{10})$ or $(R^7 R^8 R^9 R^{10})$ PB $(R^7 R^8 R^9 R^{10})$ wherein $R^7$ $R^8$ $R^9$ $R^{10}$ are independently hydrogen atom, alkyl group having 1 to 10 carbon atoms, alkoxy group, cycloalkyl group having 5 to 10 carbon atoms which constitutes the ring, carbocyclic aromatic group having 5 to 10 carbon atoms which constitutes the ring and carbocyclic aralkyl group having 6 to 10 carbon atoms and like boron compounds; silicon oxide, sodium silicate, tetraalkylsilicon, tetraarylsilicon, diphenylethylethoxysilicon, and like silicon compounds; germanium oxide, germanium tetrachloride, germanium ethoxide, germanium phenoxide and like germanium compounds; tin oxide, dialkyltin oxide, dialkyltin carboxylate, tin acetate, tributyltin methoxide, butyltin triethoxide, ethyltin tributoxide and like tin compounds with alkoxy group bonded thereto, organotin compounds and like tin compounds; lead oxide, lead acetate, lead carbonate, basic carbonate, alkoxides or aryloxides of lead and organic lead and like lead compounds; quaternary ammonium salts, quaternary phosphonium salts, quaternary arsonium salts and like onium salt compounds; antimony oxide, antimony acetate and like antimony compounds; manganese acetate, manganese carbonate, manganese borate and like manganese compounds; titanium oxide, alkoxides or aryloxides of titanium and like titanium compounds; zirconium oxide, ziconium acetate, alkoxides or aryloxides of zirconium, acetylacetone of zirconium and like zirconium compounds.

These catalysts may be used either alone or in combination. The amount of the catalyst to be used is selected from the range of $10^{-5}$ to 10% by weight, preferably $10^{-3}$ to 1% by weight.

The ratio of ester exchange between the phosphazene flame retardant and the polyester resin is usually 30% or more, more preferably 80% or more. Desirably the upper limit is as near as 100%, but usually 30 to 99%, preferably 80 to 98%.

The production process of the invention will be described below with reference to the drawing.

FIG. 1 is a schematic view showing the production process of the invention by way of example wherein a melt of the polyester resin is kneaded and extruded to give pellets.

Referring to FIG. 1, indicated at 1 is a twin-screw kneader (kneader-type extruder); at 1a, a hopper disposed at a rear portion of the kneader for introducing a resin; at 1b, a hopper provided intermediately in the kneader; at 1c, a screw accommodated in the kneader; at 1d, a mold for producing strands, provided at the forward end of the kneader; at 2, a water tank for cooling; and at 3, a cutter.

According to an illustrated embodiment, a polyester resin 4 as the raw material is dried by preheating and is placed into a kneader 1 via a hopper 1a at a rear portion of the kneader 1 wherein the polyester resin 4 is heated to higher than the melt temperature of the resin 4 (but below the decomposition temperature thereof) to become melted and is kneaded by a screw 1c. A mixture 5 of a phosphazene flame retardant and a catalyst for ester exchange reaction is charged into the kneader 1 via a hopper 1b arranged intermediately. The mixture 5 is uniformly kneaded together with the molten polyester resin 4 by the screw 1c and is forced out as a rope-shaped product from a mold 1d. The molded product is taken out while cooled in the cooling water tank 2, and is cut to a predetermined size by the cutter 3.

When the phosphazene flame retardant and the catalyst for ester exchange reaction are kneaded as described above, the phosphazene flame retardant induces ester exchange reaction at the ester linkage portion in the molecules of the resin or at the end of molecules thereof, whereby the flame retardant is bonded to the molecules of the resin by ester linkage. The ester exchange reaction proceeds while the polyester resin 4 is in a molten state.

When the pellets of polyester resin containing the phosphazene flame retardant are prepared by the above-mentioned process, the phosphazene flame retardant is bonded by ester linakge and is immobilized in the molecules of polyester resin or at the end of molecules thereof without vaporization or dissipation of retardant from the pellets with time.

The polyester resin 4 suitable as the raw material has a relatively high melt temperature and readily causes ester exchange reaction. Suitable polyester resins are, for example, polycarbonate, polyethylene terephthalate, polybutylene terephthalate, polyarylate, polyoxybenzoyl, polycaprolactone and like thermoplastic polyester resins.

The ester exchange reaction occurs between the polyester resin and the phosphazene flame retardant when, as described above, the polyester resin is heated to higher than the melt temperature of the resin but lower than the decompostion temperature thereof to become melted. If a polycarbonate resin, for example, is used as the polyester resin, the polycarbonate resin is heated at a temperature of about 230 to about 330° C. in the kneader 1 to become melted. The time taken for the ester exchange reaction is slightly variable depending on the kind of flame retardant and kind of polyester resin used, but the reaction is practically completed in approximately 1 to 15 minutes. In preparing pellets of resin composition as in the above-mentioned production example, the mixture 5 of flame retardant and catalyst for ester exchange is added to the melt of polyester resin 4 present in the kneader 1, and the blend is kneaded for about 1 to about 15 minutes and is forced out from the mold id at the forward end of the kneader 1. In order to carry out the foregoing operation, the position of intermediate hopper 1b, the design of the screw and other extrusion conditions should be prearranged or considered for satisfactory practice of ester exchange reaction. In that case, a twin-screw extruder or kneader is suitably used.

In said embodiment, the polyester resin 4 is charged into the kneader 1 through the hopper 1a, and the mixture 5 of flame retardant and catalyst for ester exchange, through the hopper 1b. Optionally the polyester resin 4 and the mixture 5 may be introduced together into the kneader 1 through any one of the hoppers, or the phosphazene flame retardant and the catalyst may be separately charged thereinto.

In the foregoing preparation example, the melt is forced out from the mold id to give pellets after ester exchange reaction of the polyester resin with the phosphazene flame retardant. It is possible, of course, to produce extrusion-molded products in various shapes such as resin plates, sheets, films or moldings of specific shapes. Further, a resin plate of two or three layers can be produced with use of a co-extruder or the like. Such multi-layer resin plate comprises a top layer composed of the polyester resin containing the phosphazene flame retardant bonded thereto by ester linkage, a second layer and a third layer each formed by co-extrusion molding of a polyester resin or other resin containing no or less amount of phosphazene flame retardant compared with the top layer. Namely it is possible to produce a two- or three-layer resin plate having a layer of phosphazene-containing polyester resin on the surface of the molded product.

Likewise in injection molding, a resin molded product can be produced with little or no vaporization of flame retardant, when a melt of polyester resin is mixed with the flame retardant and the ester exchange catalyst to induce ester exchange before the melt thereof is injected into the mold of injection molding machine.

The resin composition of the invention can exhibit a high flame retardant effect although free of a compound containing chlorine, bromine or like halogen elements as a flame-retardant component and can contain a suitable combination of additives conventionally used for imparting flame retardance. Additives useful for rendering the resin flame-retardant are not limited insofar as they are useful in giving flame retardance. Examples of such additives are zinc oxide, tin oxide, iron oxide, molybdenum oxide, copper oxide, manganese dioxide and like metallic oxides, aluminum hydroxide, magnesium hydroxide, zirconium hydroxide, aluminum hydroxide treated with oxalic acid and magnesium hydroxide treated with a nickel compound and like metal hydroxides, sodium carbonate, calcium carbonate, barium carbonate, sodium alkylsulfonate and like alkali metal salts or alkaline earth metal salts, chlorinated paraffin, perchlorocyclopentadecane, tetrabromobisphenol A, tetrabromobisphenol A epoxy oligomer or polymer, bis (tribromophenoxy)ethane, bis(tetrabromophthalimino) ethane and like organic chlorine or bromine compounds, antimony trioxide, antimony tetraoxide, antimony pentoxide, sodium antimonate and like antimony compounds, triphenyl phosphate, tricresyl phosphate, trixylyl phosphate, cresyldiphenyl phosphate, xylyldiphenyl phosphate, tolyldixylyl phosphate, (2-ethylhexyl)diphenyl phosphate and like phosphoric acid esters, hydroxyl-containing phosphoric acid ester, resorcinol bis(diphenyl) phosphate, hydroquinone bis(diphenyl)phosphate, bisphenol A bis(diphenyl)phosphate, resorcinol bis(dixylyl)phosphate, hydroquinone bis(dixylyl)phosphate, bisphenol A bis (ditolyl)phosphate, biphenol bis(dixylyl)phosphate, bisphenol A bis(dixylyl) phosphate and like condensed phosphoric acid ester compounds, red phosphorus, halogen-containing phosphoric acid ester compounds, halogen-containing condensed phosphoric acid ester compounds, phosphonic acid ester compounds, triphenylphosphine oxide, tritolylphosphine oxide and like phosphine oxide compounds, melamine, melamine cyanurate, melamine phosphate, melam, melem, melon, succinoguanamine, guanidine sulfamate, ammonium sulfate, ammonium phosphate, ammonium polyphosphate, alkylamine phosphate and like nitrogen-containing compounds, zinc borate, barium metaborate, ammonium borate and like boron compounds, silicon polymer, silica and like silicon compounds and thermally expanding graphite.

These additives for flame retardance can be used either alone or in combination.

The resin composition of the invention admixed with a fluorine-containing resin is likely to produce synergistic flame retardant effects, for example, the prevention of dropping the resin melted by ignition. There is no limitation on the kind of such fluorine-containing resins insofar as they are fluorinated polymers. Preferred resins are polymers having fluorine atoms bonded directly to the main chain of polymer. Examples of useful fluorine-containing resins are poly(tetrafluoroethylene), poly(chlorotrifluoroethylene), poly(vinylidene fluoride), tetrafluoroethylene-hexafluoropropylene copolymers, tetrafluoroethylene-perfluoroalkyl vinyl ether copolymers and tetrafluoroethylene-ethylene copolymers. These fluorine-containing resins can be used in any of forms such as emulsions, suspensions, microfibrils, powders or granules. The fluorine-containing resins can be used either alone or in combination.

Optionally the resin composition of the invention may contain a suitable combination of additives for resins and fillers in the ranges of kinds and amounts which do not deteriorate the properties of the resin composition. Examples of useful additives for resins are UV absorbers, light stabilizers, antioxidants, light screens, metal inactivating agents, light extinguishers, heat resistance stabilizers, lubricants, mold release agents, coloring agents, antistatic agents, age resistors, plasticizers, impact strength modifiers and compatibilizers.

Examples of useful fillers are mica, kaolin, talc, silica, clay, calcium carbonate, calcium sulfate, calcium silicate, glass beads, glass balloons, glass flakes, glass fibers, fibrous alkali titanate, fibrous transition metal salts of boric acid, fibrous alkaline earth metal salts of boric acid, zinc oxide whiskers, titanium oxide whiskers, magnesium oxide whiskers, gypsum whiskers, aluminum silicate whiskers, calcium silicate whiskers, silicon carbide whiskers, titanium carbide whiskers, silicon nitride whiskers, titanium nitride whiskers, carbon fibers, alumina fibers, alumin-silica fibers, zirconia fibers, quartz fibers and metal fibers. Typical examples of fibrous alkali metals of titanic acid, fibrous transition metal salts of boric acid and fibrous alkaline earth metal salts of boric acid are potassium titanate fibers, aluminum borate fibers and magnesium borate fibers. These additives and fillers can be used either alone or in combination.

The thus-obtained resin composition can be used in industrial fields including the fields of electricity, electron, communications, agriculture, forestry, fisheries, mining, construction, foods, fibers, clothes, medical services, coal, petroleum, rubbers, leathers, automobiles, precision machines, timbers, furniture, printing and musical instruments. For example, the resin composition of the invention can be used for printers, personal computers, word processors, keyboards, PDA (personal digital assistants), telephones, facsimile machines, copiers, ECR (electronic cash registers), desk-top calculators, electronic notebooks, electronic dictionaries, cards, holders, stationeries, business machines, office automation machines, washing machines, refrigerators, vacuum cleaners, electronic ovens, illuminators, game machines, irons, domestic electrical appliances such as electrical foot warmers, television sets, VTR, video cameras, digital cameras, radio-casette players, tape recorders, mini-discs, CD players, PD (phase change & dual function), DVD, speakers, liquid crystal displays and like audiovisual devices, connectors, relays, condensers, switches, printed boards, coil bobbins, semi-conductor sealers, electrical wires, cables, transformers, deflecting yokes, distributing boards, electrical or electronic components for watches or the like and communications equipment. The resin composition of the invention finds applications in a wide variety of other products including seats (stuffings, covering materials and the like), belts, ceiling materials, convertible top materials, armrests, door trims, rear package trays, carpets, mats, sunvisors, wheel covers, mattress covers, air bags, insulators, hand straps, strap strips, electrical wire-coating materials, electrical insulating materials, coating compositions, coating materials, covering materials, floor materials, corner walls, deck panels, covers, veneer boards, ceiling boards, partition boards, side walls, carpets, wall papers, wall-decorating materials, exterior trims, interior trims, roof materials, sound-absorbing materials, heat-insulating materials, sash materials and other materials for automobiles, vehicles, ships and aircraft, building materials, clothes, curtains, sheets, plywoods, synthetic fiber boards, carpets, doormats, sheets, buckets, hoses, containers, spectacles, bags, cases, goggles, ski goods, rackets, tents, musical instruments, toys and other goods for daily use or for sports and leisure.

BEST MODE OF CARRYING OUT THE INVENTION

The present invention will be described in more detail with reference to the following examples to which, however, the present invention is not limited at all.

EXAMPLE 1

Dry-blended were 100 parts by weight of an aromatic polycarbonate resin, 12 parts by weight of a phosphazene flame retardant having the following structure and 0.03 part by weight of dibutyltin oxide as a catalyst for ester exchange reaction. UPIRON S-2000 (brand name for a product of Mitsubishi Engineering Plastics Co., Ltd.) was used as the aromatic polycarbonate resin (the same hereinafter).

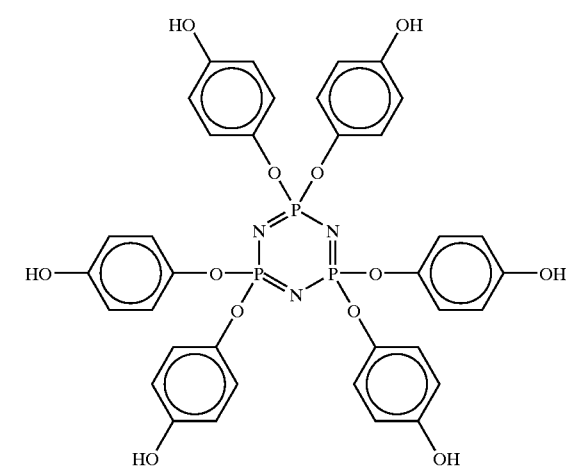

The obtained blend was charged into an extrusion kneader and was heated to 270° C. to obtain a melt. Then the melt was kneaded and was forced out from the kneader after ester exchange reaction for about 3 minutes, whereby a test piece (1) for use in the following tests was prepared.

The test piece (1) was checked as described below to see whether the phosphazene flame retardant having reactive group was melted and kneaded together with the polyester resin, whereby ester exchange reaction was induced to react the flame retardant with the resin. A phosphazene flame retardant free of reactive group was used as a comparative sample.

Confirmation of Reaction

Figure 1:
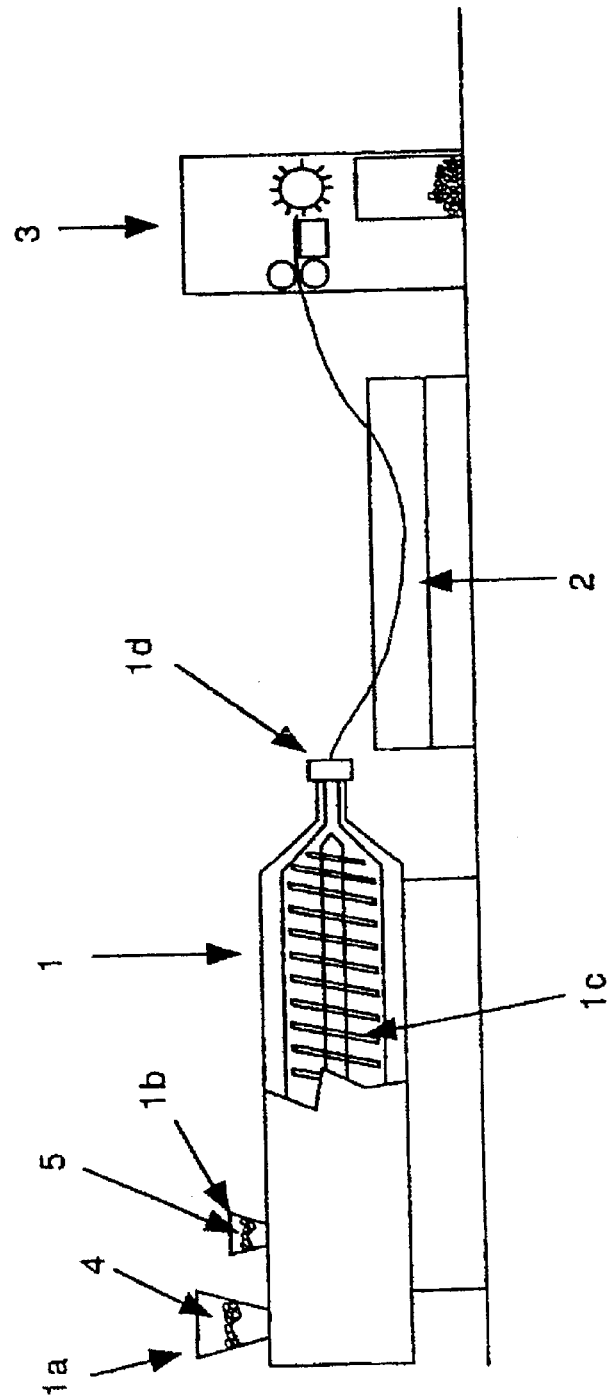
FIG. 1 shows a view schematically showing the production process of the invention by way of example.
Figure 2:
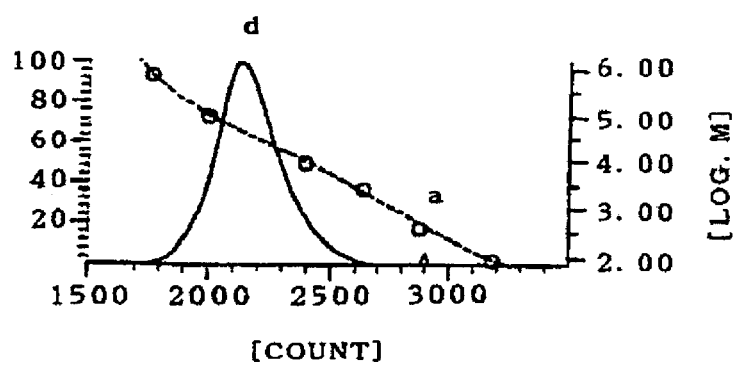
FIG. 2 shows a distribution curve of molecular weight of a test piece (1) according to the measurement by GPC. The symbol "M" indicated beside the ordinate axis on the right side of the drawing is short for molecular weight.
Figure 4:
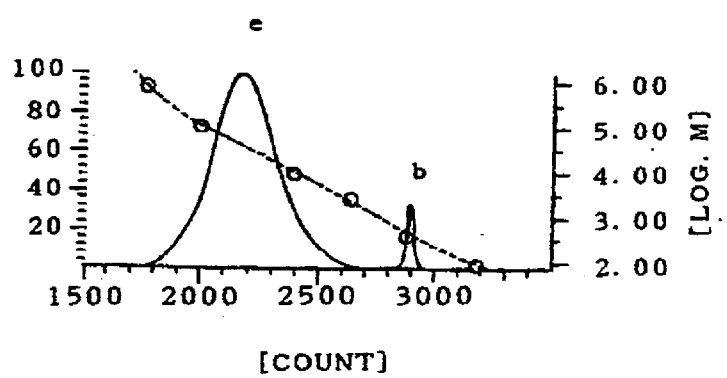
FIG. 4 shows a distribution curve of molecular weight of a comparative test piece (51) according to the measurement by GPC.

The test piece (1) obtained in Example 1 was dissolved in tetrahydrofuran. Then the distribution of molecular weight of test piece (1) was measured by a gel permeation chromatography (GPC) device equipped with a differential refractometer. For comparison with the test piece of Example 1, a flame retardant free of reactive group was blended with the polycarbonate resin as described later in Comparative Example 1 in the same proportions as in Example 1, and the blend was melted and kneaded to give a comparative test piece (51) which did not undergo ester exchange reaction. The distribution curve of molecular weight of the test piece (51) based on the measurement by GPC is as shown in FIG. 4 wherein the peak (b) of flame retardant appeared on the side of low molecular weight (right side on the abscissa axis). On the other hand, the curve distribution of molecular weight of the test piece (1) obtained in Example 1 based on the measurement by GPC is as shown in FIG. 2 wherein the peak (a) of flame retardant appeared substantially at the same eluation time as the peak (b) of retardant not involving ester exchange reaction but with a reduced detection intensity. The lowered peak (a) presumably shifted and appeared as the peak (d) on the side of high molecular weight (left side on the abscissa axis). Namely, the reaction of flame retardant with the polycarbonate made the flame retardant into a high molecular weight one, resulting in shift of the peak. Indicated at (d) is the peak of reacted portion and at (a), the peak of unreacted portion. Subsequently the test piece (1) obtained in Example 1 was purified to remove the unreacted flame retardant. Then it was confirmed by FT (Fourier Transform) -IR, $^1$H-NMR and $^{13}$C-NMR whether the flame retardant was bonded to the polycarbonate by ester linkage. This also confirmed that the peak (d) did not indicate homopolymerization of flame retardant alone.

The test piece (1) was also checked according to the test method described below to determine the quantity ratio (residue ratio) between the phosphazene flame retardant existing as unreacted before kneading the melt and the phosphazene flame retardant remaining unreacted after kneading the melt. The flame retardant was found to have performed the ester exchange reaction at a residue ratio of about 6%.

Method of Measuring Residue Ratio

Figure 3:
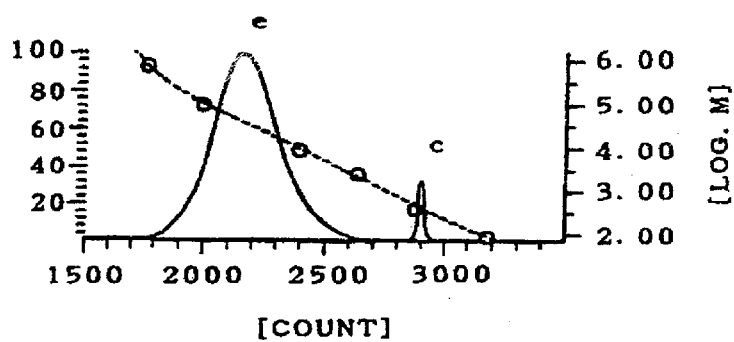
FIG. 3 shows a distribution curve of molecular weight of a test piece (1') before kneading the melt according to the measurement by GPC.

The residue ratio was confirmed using a GPC device as in the confirmation of reaction as described above. The blend which did not undergo ester exchange reaction before kneading the melt in Example 1 was taken as a test piece (1'). The distribution curve of molecular weight of the test piece (1') according to the measurement by GPC is as shown in FIG. 3 wherein the peak (c) of flame retardant appeared on the side of low molecular weight (right side on the abscissa axis). On the other hand, the distribution curve of molecular weight of the test piece (1) involving kneading the melt in Example 1 according to the measurement by GPC is as shown in FIG. 2 wherein the peak (a) of flame retardant appeared substantially at the same elution time as the peak (c) of retardant not involving ester exchange reaction but with an exceedingly reduced detection intensity. The lowered peak (a) presumably shifted and appeared at the position of the peak (d) on the side of high molecular weight (left side on the abscissa axis). Namely, the reaction of flame retardant and polycarbonate made the flame retardant into a high molecular weight one, resulting in shift of the peak. Indicated at (a) and (c) are the peaks of unreacted portion; at (d), the peak of reacted portion; and at (e), the peak of resin portion. The residue ratio was calculated from the area of peaks (a), (c), (d) and (e) by the following equation.

Residue ratio (%)=[(a)/{(d)+(a)}]/[(c)/{(e)+(c)}]×100

The test piece (1) was subjected to a burning test by the test method of UL-94. The Izod impact strength and heat deformation temperature were measured and accelerated weathering test was conducted according to the following methods.

Burning Test

The burning test was carried out by a vertical flame test method as prescribed in UL-94. The result was taken as an index of flame retardance. (The test piece had a thickness of ¹⁄₁₆ inch.)

Izod Impact Strength

The Izod impact strength was determined at 23° C. by a method in accordance with JIS K-7210 and the result was taken as an index of impact resistance. (The test piece had a thickness of ⅛ inch and was V-notched.)

Heat Deformation Temperature

The heat deformation temperature was determined by the method as defined in ASTM D-648 and the result was taken as an index of heat resistance.

Accelerated Weathering Test

The accelerated weathering test was conducted using a sunshine carbon weather meter (Suga tester, WEL-SUN DCH Model, rainfall: 18 minutes/1 cycle: 120 minutes) as an accelerated weathering tester. After 500 hours of the test, the appearance of the test piece was visually evaluated. Also after 500 hours of the test, the burning test as defined in UL-94 was performed to confirm the change of flame retardance.

Criteria for Evaluation of Appearance

○: No change

Δ: The surface was blanched or discolored.

×: Cracked

When the polyester resin containing the phosphazene flame retardant was melted and kneaded to obtain the test piece (1), the phosphazene flame retardant did not scatter away or adhere to the mold. In Examples 2 to 18 to be described below, there was no scatter or adhesion of phosphazene flame retardant to the mold.

EXAMPLE 2

A test piece (2) was prepared in the same manner as in Example 1 with the exception of dry-blending 100 parts by weight of an aromatic polycarbonate resin, 15 parts by weight of a phosphazene flame retardant having the following structure and 0.3 part by weight of zinc oxide as a catalyst. The test piece (2) was assessed for properties as done in Example 1. The results are shown in Table 1.

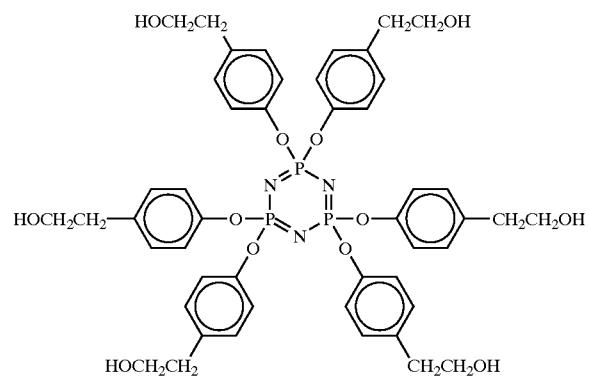

EXAMPLE 3

A test piece (3) was prepared in the same manner as in Example 1 with the exception of dry-blending 100 parts by weight of an aromatic polycarbonate resin, 12 parts byweight of cyclic and straight-chain phosphazene flame retardants represented by the following structural formula wherein n is an integer of 3 to 25 and 0.2 part by weight of ferric chloride as a catalyst. The test piece (3) was assessed for properties as done in Example 1. The results are shown in Table 1.

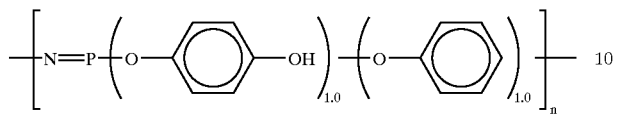

EXAMPLE 4

A test piece (4) was prepared in the same manner as in Example 1 with the exception of adding to 100 parts by weight of an aromatic polycarbonate resin 12 parts by weight of cyclic and straight-chain phosphazene flame retardants represented by the following structural formula wherein n is an integer of 3 to 25. The test piece (4) was assessed for properties as done in Example 1. The results are shown in Table 1.

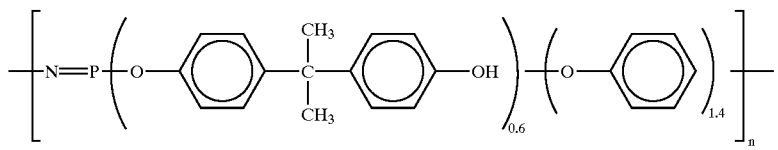

EXAMPLE 5

A test piece (5) was prepared in the same manner as in Example 1 with the exception of adding 12 parts by weight of cyclic and straight-chain phosphazene flame retardants represented by the following structural formula wherein n is an integer of 3 to 25 to 100 parts by weight of an aromatic polycarbonate resin. The test piece (5) was assessed for properties as done in Example 1. The results are shown in Table 1.

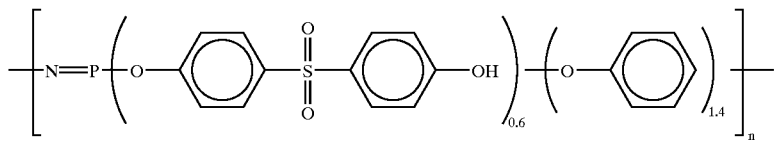

EXAMPLE 6

A test piece (6) was prepared in the same manner as in Example 1 with the exception of adding 12 parts by weight of phosphazene flame retardants represented by the following structural formula to 100 parts by weight of an aromatic polycarbonate resin. The test piece (6) was assessed for properties as done in Example 1. The results are shown in Table 1.

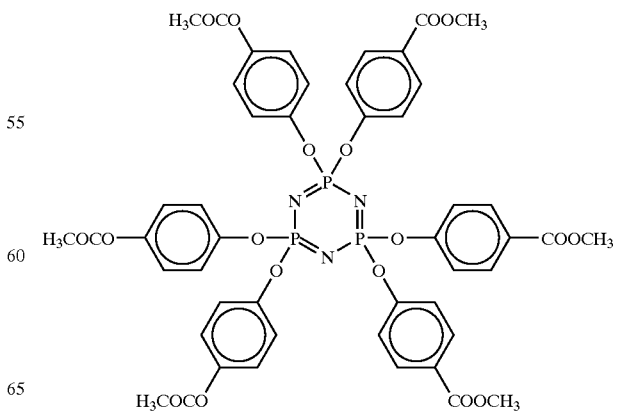

EXAMPLE 7

A test piece (7) was prepared in the same manner as in Example 1 with the exception of adding to 100 parts by weight of an aromatic polycarbonate resin 12 parts by weight of straight-chain phosphazene flame retardants represented by the following structural formula wherein n is an integer of 3 to 1000. The test piece (7) was assessed for properties as done in Example 1. The results are shown in Table 1.

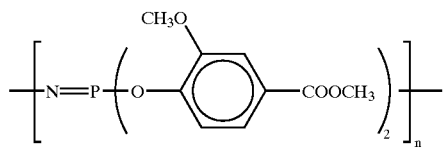

EXAMPLE 8

A test piece (8) was prepared in the same manner as in Example 1 with the exception of adding to 100 parts by weight of an aromatic polycarbonate resin 12 parts by weight of cyclic and straight-chain phosphazene flame retardants represented by the following structural formula wherein n is an integer of 3 to 25. The test piece (8) was assessed for properties as done in Example 1. The results are shown in Table 1.

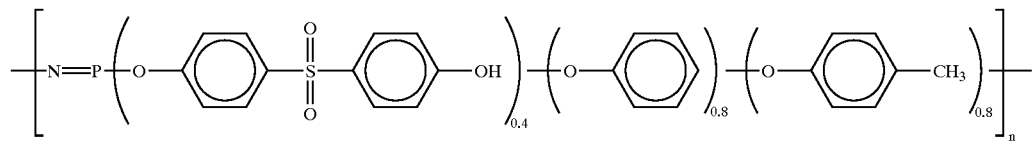

EXAMPLE 9

A test piece (9) was prepared in the same manner as in Example 1 with the exception of using no ester-exchange catalyst. The test piece (9) was assessed for properties as done in Example 1. The results are shown in Table 1.

EXAMPLE 10

A test piece (10) was prepared in the same manner as in Example 1 with the exception of adding to 100 parts by weight of an aromatic polycarbonate resin 12 parts by weight of cyclic and straight-chain phosphazene flame retardants represented by the following structural formula wherein n is an integer of 3 to 25. The test piece (10) was assessed for properties as done in Example 1. The results are shown in Table 1.

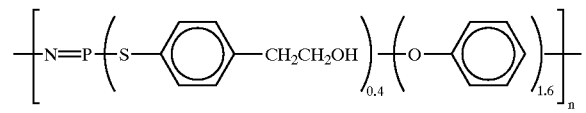

EXAMPLE 11

A test piece (11) was prepared in the same manner as in Example 1 with the exception of adding to 100 parts by weight of an aromatic polycarbonate resin 12 parts by weight of cyclic and straight-chain phosphazene flame retardants represented by the following structural formula wherein n is an integer of 3 to 25. The test piece (11) was assessed for properties as done in Example 1. The results are shown in Table 1.

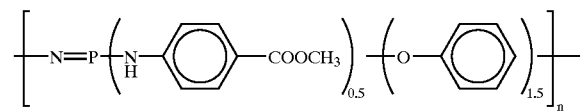

EXAMPLE 12

Dry-blended were 75 parts by weight of an aromatic polycarbonate resin, 25 parts by weight of ABS resin, 10 parts by weight of the phosphazene flame retardants used in Example 1 and 0.3 part by weight of ferric chloride as an ester-exchange catalyst. A test piece (12) was prepared in the same manner as in Example 1 with the exception of charging the obtained blend into an extrusion kneader and heating to 230° C. to obtain a melt. The test piece (12) was assessed for properties as done in Example 1. The results are shown in Table 1.

EXAMPLE 13

A test piece (13) was prepared in the same manner as in Example 12 with the exception of using the phosphazene flame retardants used in Example 3 in place of the phosphazene flame retardants used in Example 12. The test piece (13) was assessed for properties as done in Example 1. The results are shown in Table 1.

EXAMPLE 14

A test piece (14) was prepared in the same manner as in Example 12 with the exception of using the phosphazene flame retardants used in Example 5 in place of the phosphazene flame retardants used in Example 12. The test piece (14) was assessed for properties as done in Example 1. The results are shown in Table 1.

EXAMPLE 15

Dry-blended were 70 parts by weight of an aromatic polycarbonate resin, 30 parts by weight of polybutylene terephthalate resin, 10 parts by weight of the phosphazene flame retardants used in Example 1 and 0.2 part by weight of ferric chloride as an ester-exchange catalyst. A test piece (15) was prepared in the same manner as in Example 1 with the exception of charging the obtained blend into an extrusion kneader and heating to 230° C. to obtain a melt. The test piece (15) was assessed for residue rate of the flame retardants, burning test by the test method of UL-94, izod impact strength, heat deformation temperature and weathering test. The results are shown in Table 1.

EXAMPLE 16

A test piece (16) was prepared in the same manner as in Example 15 with the exception of using the phosphazene flame retardants used in Example 3 in place of the phosphazene flame retardants used in Example 15. The test piece (16) was assessed for properties as done in Example 1. The results are shown in Table 1.

EXAMPLE 17

A test piece (17) was prepared in the same manner as in Example 15 with the exception of using the phosphazene flame retardants used in Example 5 in place of the phosphazene flame retardants used in Example 15. The test piece (17) was assessed for properties as done in Example 1. The results are shown in Table 1.

EXAMPLE 18

A test piece (18) was prepared in the same manner as in Example 1 with the exception of not using an ester-exchange catalyst, dibutyltin oxide. The test piece (18) was assessed for properties as done in Example 1. The results are shown in Table 1.

COMPARATIVE EXAMPLE 1

A test piece (51) was prepared in the same manner as in Example 1 with the exception of using the phosphazene flame retardants represented by the following structural formula. The test piece (51) was assessed for properties as done in Example 1. The results are shown in Table 1.

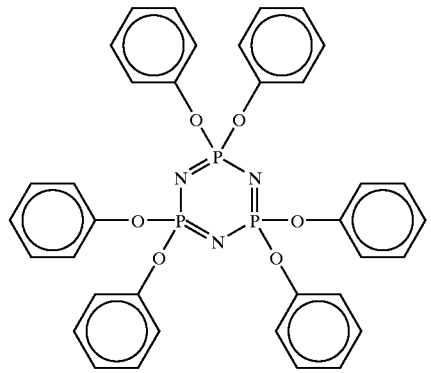

COMPARATIVE EXAMPLE 2

A test piece (52) was prepared in the same manner as in Example 1 with the exception of using triphenyl phosphite in place of the phosphazene flame retardants used in Example 1. The test piece (52) was assessed for properties as done in Example 1. The results are shown in Table 1.

COMPARATIVES EXAMPLE 3

A test piece (53) was prepared in the same manner as in Example 1 using resorcinol-cross linked condensed phosphoric acid diphenyl ester (brand name for a product of Daihachi Kagaku Kogyo K. K., a compound identical with CR 733S) in place of the phosphazene flame retardants used in Example 1. The test piece (53) was assessed for properties as done in Example 1. The results are shown in Table 1.

COMPARATIVE EXAMPLE 4

A test piece (54) was prepared in the same manner as in Example 1 using resorcinol-crosslinked condensed phosphoric acid di(2,6-xylyl) ester (brand name for a product of Daihachi Kagaku Kogyo K. K., a compound identical with PX-200) in place of the phosphazene flame retardants used in Example 1. The test piece (54) was assessed for properties as done in Example 1. The results are shown in Table 1.

COMPARATIVE EXAMPLE 5

A test piece (55) was prepared in the same manner as in Example 12 using resorcinol-crosslinked condensed phosphoric acid diphenyl ester (brand name for a product of Daihachi Kagaku Kogyo K. K., a compound identical with CR 733S) in place of the phosphazene flame retardants used in Example 12. The test piece (55) was assessed for properties as done in Example 1. The results are shown in Table 1.

COMPARATIVE EXAMPLE 6

A test piece (56) was prepared in the same manner as in Example 15 using resorcinol-crosslinked condensed phosphoric acid diphenyl ester (brand name for a product of Daihachi Kagaku Kogyo K. K., a compound identical with CR 733S) in place of the phosphazene flame retardants used in Example 15. The test piece (56) was assessed for properties as done in Example 1. The results are shown in Table 1.

TABLE 1

|  | Residue ratio (%) | UL-94 flame retardance | Izod Impact (kgf · cm/cm) | Heat deformation temperature | weathering test after 500 h | Weathering Test UL-94 flame retardance |
|---|---|---|---|---|---|---|
| Ex. 1 | 6 | V-0 | 82 | 135 | ○ | V-0 |
| Ex. 2 | 4 | V-0 | 88 | 133 | ○ | V-0 |
| Ex. 3 | 4 | V-0 | 86 | 135 | ○ | V-0 |
| Ex. 4 | 7 | V-0 | 89 | 130 | ○ | V-0 |
| Ex. 5 | 3 | V-0 | 85 | 133 | ○ | V-0 |
| Ex. 6 | 5 | V-0 | 90 | 134 | ○ | V-0 |
| Ex. 7 | 4 | V-0 | 83 | 130 | ○ | V-0 |
| Ex. 8 | 5 | V-0 | 86 | 130 | ○ | V-0 |
| Ex. 9 | 7 | V-0 | 87 | 133 | ○ | V-0 |
| Ex. 10 | 4 | V-0 | 81 | 135 | ○ | V-0 |
| Ex. 11 | 5 | V-0 | 88 | 133 | ○ | V-0 |
| Ex. 12 | 5 | V-0 | 60 | 110 | ○ | V-0 |

TABLE 1-continued

|  | Residue ratio (%) | UL-94 flame retardance | Izod Impact (kgf · cm/cm) | Heat deformation temperature | weathering test after 500 h | Weathering Test UL-94 flame retardance |
|---|---|---|---|---|---|---|
| Ex. 13 | 4 | V-0 | 58 | 105 | ○ | V-0 |
| Ex. 14 | 5 | V-0 | 61 | 111 | ○ | V-0 |
| Ex. 15 | 5 | V-0 | 110 | 109 | ○ | V-0 |
| Ex. 16 | 5 | V-0 | 112 | 108 | ○ | V-0 |
| Ex. 17 | 5 | V-0 | 109 | 109 | ○ | V-0 |
| Ex. 18 | 15 | V-0 | 80 | 132 | ○ | V-0 |
| Com. Ex. 1 | 99 | V-0 | 80 | 128 | Δ | V-0 |
| Com. Ex. 2 | 97 | spec.out | 49 | 98 | x | spec.out |
| Com. Ex. 3 | 99 | V-2 | 53 | 112 | x | spec.out |
| Com. Ex. 4 | 98 | V-2 | 50 | 93 | x | V-2 |
| Com. Ex. 5 | 95 | V-2 | 100 | 103 | x | spec.out |
| Com. Ex. 6 | 98 | spec.out | 102 | 104 | x | spec.out |

Table 1 shows that the resin compositions of the invention had a well-balanced combination of excellent flame retardance, impact resistance and heat resistance. On the other hand, the comparative test piece (51) containing the phosphazene flame retardant incapable of conducting ester exchange reaction and the comparative test pieces (52) to (56) containing the phosphoric acid ester flame retardants were likely to vaporize with time, and became more degraded in properties after irradiation for 1000 hours because the flame retardants were unable to bond to the molecules of polyester resin by ester linkage. In contrast, the test pieces (1) to (18) containing the phosphazene flame retardants capable of conducting ester exchange according to the invention were such that a major portion of flame retardant was fixed to the molecules of polyester resin by ester linkage and exhibited excellent flame retardance without causing change in appearance even by exposure to irradiation for 1000 hours. When the phosphoric acid ester compounds were used as the flame retardant in Comparative Examples 2 to 6, the obtained resin compositions showed low flame retardance and poor heat resistance, and therefore were low in commercial value.

INDUSTRIAL APPLICABILITY

As apparent from the foregoing description and the test results, the resins containing phosphazene flame retardants according to the invention can retain a high flame retardance for a prolonged term with little or no vaporization with time and is excellent in all of flame retardance, impact resistance, processability and other properties since the phosphazene flame retardant having hydroxy or ester group is immobilized to the molecules of the resin by ester linkage on ester exchange of high reactivity. Using the flame-retardant resin of the invention, a flame-retardant thermoplastic resin material free of bromine, chlorine or like halogen elements can be produced. Therefore, the present invention is industrially very valuable.

The production process of the invention can be carried out with use of various conventional general-purpose molding machines merely by adding a phosphazene flame retardant having hydroxy group or ester group to the polyester resin and heating the blend to obtain a melt. Consequently the present invention eliminates a need for newly installing a special molding machine or device and is hence economical. In addition, the process of the invention can mass-produce highly flame-retardant molded products with high efficiency.

What is claimed is:

1. A flame-retardant resin composition, comprising a phosphazene flame retardant and a polyester resin, wherein the flame retardant is bonded to the polyester resin by an ester group thereof, wherein the phosphazene flame retardant is a phosphazene of formula (I)

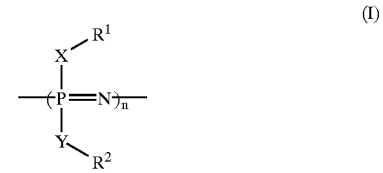

wherein n is an integer,

X and Y are independently, O, S, NH or $NR^3$, wherein $R^3$ is an alkyl group having 1 to 4 carbon atoms, at least one of $R^1$ and $R^2$, which are n in number, is a group selected from the group consisting of formula (2)

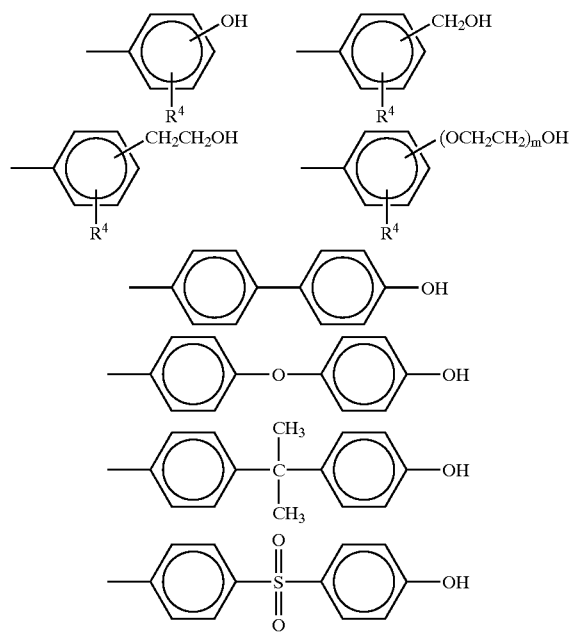

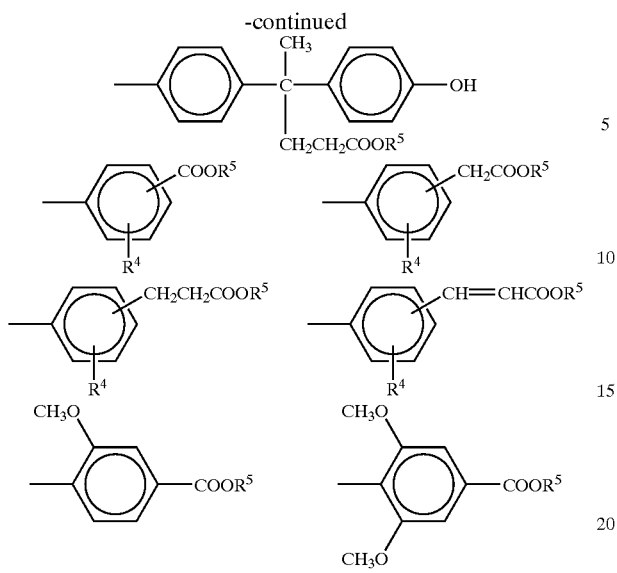

and the remaining $R^1$ and $R^2$ groups are independently, a group selected from the group consisting of formula (3)

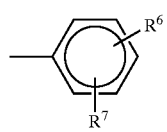

wherein each of $R^4$, $R^6$ and $R^7$ is a hydrogen atom or alkyl group having 1 to 4 carbon atoms, $R^5$ is an alkyl group having 1 to 4 carbon atoms, m is an integer of 1 to 10, and n is an integer of 3 to 25 when the phosphazene is a cyclic compound, or an integer of 3 to 1000 when the phosphazene is a straight-chain compound.

2. A flame-retardant resin comprising a phosphazene flame retardant and a polycarbonate resin, wherein the flame retardant is bonded to molecules of the polycarbonate resin by an ester group thereof.

3. A flame retardant resin comprising a phosphazene flame retardant and a polycarbonate resin, wherein the flame retardant resin is obtained by an ester exchange reaction between the flame retardant and the polycarbonate resin in an amount of 0.1 to 100 parts by weight per 100 parts by weight of the polycarbonate resin.

4. A process for preparing a flame-retardant resin comprising a phosphazene flame retardant and a polyester resin, the process comprising conducting an ester exchange reaction between the flame retardant and the polyester resin in a molten state, wherein the phosphazene is free of halogen atoms.

5. A process for preparing a flame-retardant resin comprising a phosphazene flame retardant and a polyester resin, the process comprising conducting an ester exchange reaction between the flame retardant and the polyester resin in a molten state, wherein the phosphazene flame retardant is at least one species selected from the group of cyclic phosphazene compounds and straight-chain phosphazene compounds of formula (I)

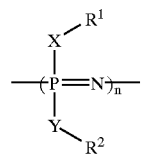

wherein n is an integer,

X and Y are independently, O, S, NH, and $NR^3$, wherein $R^3$ is an alkyl group having 1 to 4 carbon atoms, at least one $R^1$ and $R^2$, which are n in number, is a group selected from the group consisting of formula (2)

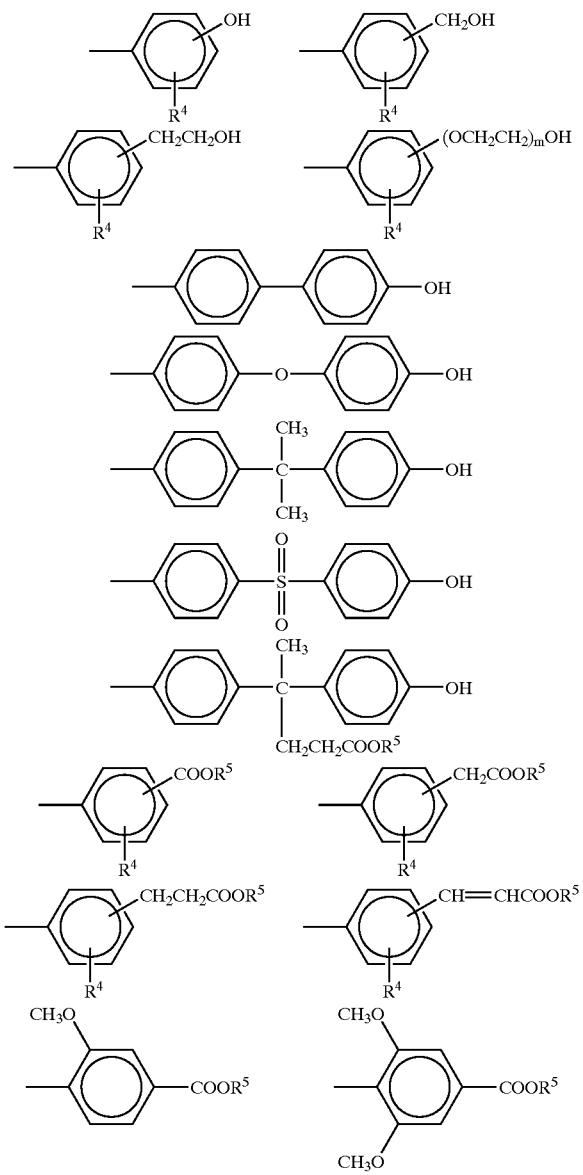

and the remaining $R^1$ and $R^2$ groups are independently, a group selected from the group consisting of formula (3)

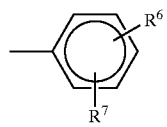

wherein
each of $R^4$, $R^6$ and $R^7$ is a hydrogen atom or alkyl group having 1 to 4 carbon atoms,
$R^5$ is an alkyl group having 1 to 4 carbon atoms,
m is an integer of 1 to 10, and
n is an integer of 3 to 25 when the phosphazene is a cyclic compound, or an integer of 3 to 1000 when the phosphazene is a straight-chain compound.

* * * * *